United States Patent [19]

Insley et al.

[11] Patent Number: 4,493,069
[45] Date of Patent: Jan. 8, 1985

[54] PHONOGRAPH

[75] Inventors: Gene L. Insley, East Aurora; Duane M. Seaburg, Oakfield; Daniel S. Pearce, Buffalo, all of N.Y.

[73] Assignee: The Quaker Oats Company, Chicago, Ill.

[21] Appl. No.: 461,460

[22] Filed: Jan. 27, 1983

[51] Int. Cl.³ .......................... G11B 1/04; G11B 17/06
[52] U.S. Cl. .................................. 369/75.1; 369/245; 369/243; 369/230; 369/225
[58] Field of Search .................. 369/75.1, 75.2, 79, 369/245, 243, 225, 63, 230; 46/175 AR

[56] References Cited

U.S. PATENT DOCUMENTS

| 2,370,875 | 3/1945 | Pressley | 369/225 |
|---|---|---|---|
| 2,532,555 | 12/1950 | Kamler | 369/79 |
| 3,261,608 | 7/1966 | Kitazawa | 369/72 |
| 4,108,444 | 8/1978 | Takizawa | 369/243 |
| 4,195,845 | 4/1980 | Inaba | 369/243 |
| 4,303,999 | 12/1981 | Irvin | 369/75.1 |
| 4,320,494 | 3/1982 | Lehmann | 369/243 |
| 4,437,178 | 3/1984 | Miyoshi | 369/75.1 |
| 4,447,900 | 5/1984 | Schatteman | 369/75.1 |

FOREIGN PATENT DOCUMENTS 533356 2/1941 United Kingdom .

Primary Examiner—Steven L. Stephan
Assistant Examiner—Thomas P. Matecki
Attorney, Agent, or Firm—Cumpston & Shaw

[57] ABSTRACT

A phonograph cover is coupled to a tone arm assembly such that movement of the cover to its open position automatically retracts the needle of the tone arm assembly from the record in any selected position of the tone arm assembly on the record playing portion of the record. Movement of the cover to its closed position automatically causes the needle to engage the record in any selected position of the tone arm assembly on the record playing portion of the record.

The tone arm assembly is further coupled to the phonograph turntable drive means such that the drive means is actuated upon movement of the tone arm assembly onto the record playing portion of the record. The drive means is deactuated upon movement of the tone arm assembly to a rest position located outside of the playing portion of the record.

7 Claims, 3 Drawing Figures

PHONOGRAPH

BACKGROUND OF THE INVENTION

1. Field of the Invention

The present invention relates generally to record playing devices. More specifically, the present invention relates to a phonograph in which a needle on the tone arm assembly is moved into and out of engagement with a selected position on the playing portion of a record in response to movement of the phonograph cover between its closed and open positions respectively. In addition, actuation and deactuation of the turntable drive motor is responsive to movement of the tone arm assembly between record playing and rest positions respectively.

2. Description of the Prior Art

The prior art is replete with patents relating to record playing devices in which the tone arm assembly is moved in response to movement of the cover of the record playing device. For example, U.S. Pat. No. 1,310,484 and 1,517,690 show mechanisms for both raising the tone arm assembly from the surface of the record and simultaneously repositioning the tone arm at the start of the playing portion of the record surface when the cover is raised.

Other representative patents that show devices for raising the needle of the tone arm assembly from a record surface and in some instances returning the tone arm assembly to a home or rest position outside of the playing portion of the record upon opening or closing the cover or movement of associated mechanisms include U.S. Pat. Nos. 2,025,900; 2,219,230; 2,552,757; 3,044,783; 3,281,152; 3,328,036 and 4,303,999.

A problem encountered in the past in prior art record playing devices has been controlling the rate of movement of the tone arm assembly toward and away from a record surface. In past devices in which the tone arm assembly is moved rapidly, undesirable jarring and damage to the record and needle may occur upon rapid movement of the needle into and out of engagement with the record.

Another problem encountered in the past has involved the lack of mechanism of simple design and construction for engaging or disengaging the needle and tone arm assembly from a selected position on the playing portion of the record. In the past, this operation was performed manually, and due to the instability of the manual operation, undesirable movement of the needle across the record playing surface sometimes occurred causing damage to the needle and/or record.

The above-mentioned problems are successfully overcome by the present invention.

SUMMARY OF THE INVENTION

In accordance with a preferred embodiment of the present invention, there is provided a phonograph having mechanism for automatically moving a needle into and out of engagement with a selected portion of a record playing surface in response to closing and opening the cover thereof. There is also provided mechanism for automatically actuating or deactuating a turntable drive means upon movement of the tone arm assembly between record playing and rest positions.

More specifically, the phonograph has a tone arm assembly pivotally mounted on a spindle and having a needle at one end movable vertically into and out of engagement with a record surface. The tone arm assembly is further movable radially of the record across a playing portion of the record upon rotation of the tone arm assembly through a predetermined angle in a horizontal plane. The phonograph also has a hinged cover movable between open and closed positions. Means are provided for coupling the cover to the tone arm assembly between the spindle and needle and outside of the record playing portion.

In a more specific aspect of the invention, the coupling means comprises a cam on the cover, a reciprocally movable T-shaped member for engaging the tone arm assembly, and a pivotal lever interconnecting the cam to the T-shaped lever. Movement of the cover to its open position causes the T-shaped member to vertically pivot the tone arm assembly for disengaging the needle from the record. The coupling means also comprises a spring biasing means for the lever which incorporates a damping means for controlling the rate of movement of the tone arm assembly toward and away from the record.

One advantage of the present invention is to provide a simple damping mechanism for controlling the rate of movement of the tone arm assembly and needle into and out of engagement with the record. The damping mechanism eliminates undesirable jarring and damage to the record and/or needle that might otherwise occur upon rapid movement of the needle into and out of engagement with the record.

Another advantage of the invention is to provide a mechanism of simple design and construction for engaging and disengaging the needle and tone arm assembly from any selected position on the playing portion of the record. The mechanism eliminates undesirable manual handling of the needle and tone arm assembly which might inadvertently result in movement of the needle across the record playing surface and damage to the needle and/or record.

The invention and its advantages will become more apparent from the detailed description of the invention presented below.

BRIEF DESCRIPTION OF THE DRAWING

The details of this invention will be described in connection with the accompanying drawings, in which.

DETAILED DESCRIPTION OF THE INVENTION

Figure 1:
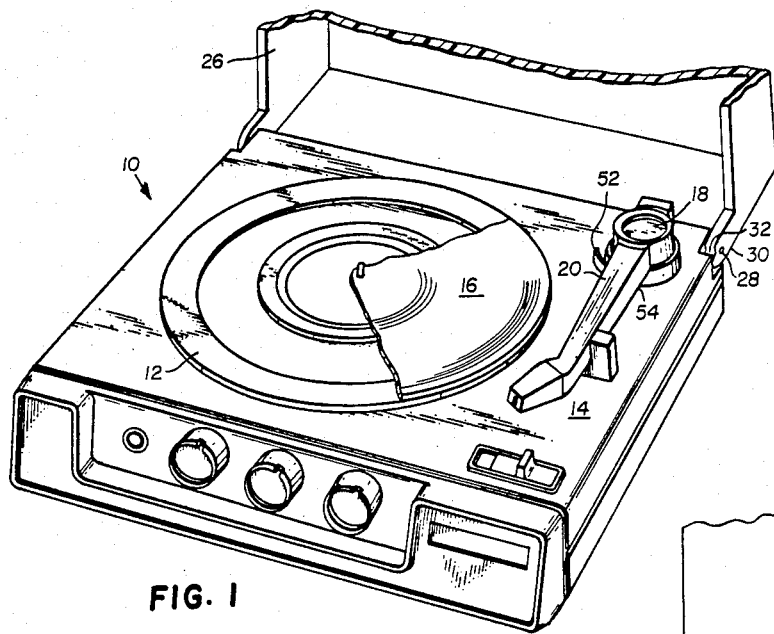
FIG. 1 is a perspective view of a phonograph in which a preferred embodiment of the present invention is incorporated.

With reference to FIG. 1 of the drawings, a phonograph 10 is illustrated in which a preferred embodiment of the present invention is incorporated. The phonograph 10 has a turntable 12 rotatably mounted on a horizontal support plate 14 for supporting a record 16, as is well known in the art. The phonograph 10 further rotatably supports a spindle 18 to which one end of a tone arm assembly 20 of known type is pivotally secured on pivot pin 22. The opposite end of the tone arm assembly 20 supports a sound pick-up needle 24 and cartridge (not shown), as is well known in the art, which is vertically movable into and out of engagement with record 16 mountable on turntable 12. By virtue of rotatable spindle 18, tone arm assembly 20 is angularly movable in a horizontal plane from a rest position, as seen in FIG. 1, across the record playing portion of record 16 for picking up the sounds recorded thereon, amplifying them and transmitting them through one or more speakers, not shown. The phonograph 10 is normally provided with a cover 26 hinged on spindles 28 extending from plate 14 for protecting the turntable and tone arm assembly from dust and damage due to inadvertent mishandling.

Figure 2:
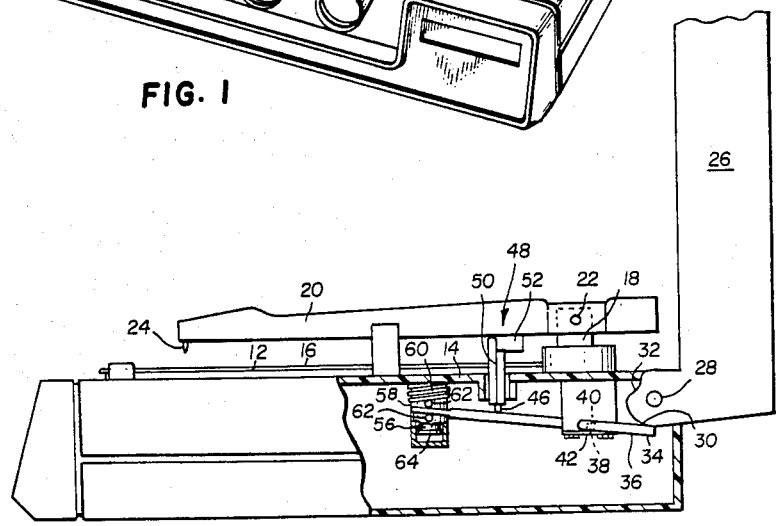
FIG. 2 is a side elevational view of the phonograph of FIG. 1 with a portion thereof broken away to show the mechanism for coupling the cover to the tone arm assembly.
Figure 3:
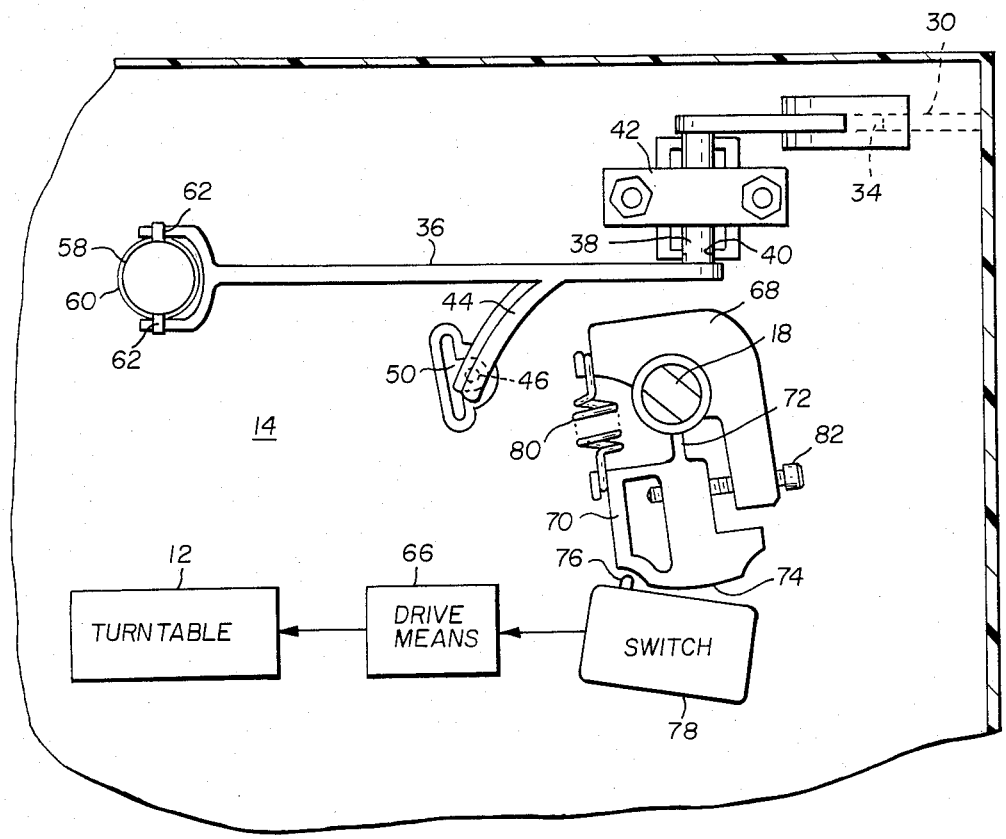
FIG. 3 is a bottom view of the mechanism of FIG. 2.

With reference to FIGS. 2 and 3, coupling means are disclosed for coupling cover 26 to tone arm assembly 20 such that movement of the cover between closed and open positions causes needle 24 to be moved into and out of engagement respectively with any selected position on the record playing portion of record 16 without damaging the record and/or needle. The coupling means comprises a cam plate 30 on cover 26 having a cam surface 32 for engaging a cam follower 34 on one end of a lever 36. Lever 36 has a round spindle 38 nesting in a complementary notch 40 and retained therein by a plate 42. Lever 36 has an arm 44 for engaging the end of a screw 46 extending through a central threaded bore in a T-shaped lifter member 48. The vertical post portion 50 of member 48 is mounted for reciprocal movement in phonograph support plate 41. The horizontal bar lifter portion 52 of member 48 is located between the upper surface of support plate 14 and the portion of the undersurface 54 of tone arm assembly 20 extending between spindle 18 and the outer periphery of the turntable 12 or any record 16 mounted thereon.

The opposite end of lever 36 extends between spaced pins 62 of a biasing means comprising a fixed cylindrical stud 56 depending from support plate 14. A cylindrical sleeve 58 open at one end encircles stud 56, and a helical spring 60 encircles sleeve 58 and is interposed between the lower surface of plate 14 and upper pins flange 62 on sleeve 58 for biasing a closed end of the sleeve against the end of lever 36. To dampen the spring action, a greased O-ring 64 is mounted in an annular groove on stud 56 for slidably engaging the inner periphery of sleeve 58.

In the operation of this aspect of the invention, movement of cover 26 to its open position causes cam plate 30 to pivot lever 36. This causes lever arm 44 to move lifter member 48 causing bar 52 to engage the undersurface 54 of tone arm assembly 20 and pivot it in a direction disengaging needle 24 from the surface of record 16. Due to the length of bar 52, disengagement of needle 24 from record 16 can be achieved in any selected position of the needle on the record. The amount of disengagement of needle 24 from record 16 is adjustable by varying the position of adjusting screw 46. Moving cover 26 to its closed position will automatically lower lifter member 48 for moving needle 24 into engagement with any selected portion of record 16.

In another aspect of the invention, movement of tone arm assembly 20 from its rest position, as seen in FIG. 1, onto record 16 automatically actuates the turntable drive means 66 of known type, depicted in block diagram form, for driving turntable 12. The coupling mechanism for achieving this, as seen in FIG. 3, comprises a bracket 68 secured to the opposite or lower end of rotatable spindle 18. A cam member 70 is secured to bracket 68 by a flexible fin 72, and has a cam surface 74 for engaging a reciprocally movable actuator pin 76 of a switch 78. Switch 78 is electrically connected to the turntable drive means 66 upon depression of pin 76 for connecting a power supply to the drive means for driving the turntable. A spring 80 urges cam member 70 in a clockwise direction, as seen in FIG. 3, toward bracket 68. An adjusting screw 82 interconnects bracket 68 and cam member 70 in opposition to spring 80, and adjusts the angular position of the cam surface 74 relative to actuator pin 76. This adjustment determines the position assumed by tone arm assembly 20 relative to record 16 when switch 78 and turntable 12 are actuated.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A phonograph having a rotatably mounted turntable for supporting a record comprising:

a tone arm assembly pivotally mounted on a spindle and having a needle at one end movable (1) into and out of engagement with a record upon pivotal movement of said tone arm assembly in a vertical plane, and (2) radially of the record across a record playing portion upon rotation of said tone arm assembly through a predetermined angle in a horizontal plane;

a hinged cover for the phonograph movable between open and closed positions; and means coupling said cover to a portion of said tone arm assembly comprised of a cam coaxial with said cover hinge, a lifter member having (1) a vertically reciprocally movable post, and (2) a horizontally extending lifter bar for engaging said tone arm assembly, and a pivotal lever having one end engageable by said cam and an opposite end engageable with said post, whereby in any selected radial position of said tone arm assembly on said record playing portion movement to said cover to its closed position causes said needle to engage said record, and movement of said cover to its open position causes said needle to disengage said record.

2. A phonograph according to claim 1 wherein said coupling means further comprises biasing means for engaging the opposite end of said pivotal lever and biasing said one end of said lever into engagement with said cam.

3. The phonograph according to claim 2 wherein said biasing means comprises a fixed stud, a sleeve reciprocally mounted on said stud, and a spring encircling said sleeve for urging said sleeve into engagement with said opposite end of said pivotal lever.

4. The phonograph according to claim 3 wherein said biasing means further comprises an O-ring mounted on said stud and interposed between said stud and said sleeve for damping said biasing means.

5. The phonograph according to claim 1 wherein said tone arm assembly has a rest position located outside of said record playing portion and said spindle is rotatable, said phonograph further comprises drive means for driving said turntable, switch means for actuating and deactuating said drive means, and second coupling means for coupling said rotatable spindle to said switch means whereby said drive means is actuated when said tone arm assembly is in any position along said record playing portion, and said drive means is deactuated when said tone arm assembly is in said rest position.

6. The phonograph according to claim 5 wherein said second coupling means comprises a bracket secured to said pivot, a cam member having a cam surface for actuating said deactuating said switch means, and a spring for urging said bracket and said cam member angularly toward one another.

7. The phonograph according to claim 6 wherein said second coupling means further comprises an adjusting screw connecting said bracket to said cam member for adjusting the position of the cam member and cam surface relative to said switch means.

* * * * *